United States Patent [19]

Soury et al.

[11] Patent Number: 5,054,042

[45] Date of Patent: Oct. 1, 1991

[54] DEVICE FOR THE SETTING UP AND ROUTING OF TELEPHONE CALLS BETWEEN SUBSCRIBERS OF A RADIO NETWORK AND/OR OF A WIRED TELEPHONE NETWORK

[75] Inventors: Jean-Pierre Soury, Cholet; Pierre Bovis, Paris; Daniel Couthouis, La Tessquale; Pierre Robert, Cholet, all of France

[73] Assignee: Thomson-CSF, Puteaux, France

[21] Appl. No.: 439,385

[22] PCT Filed: Mar. 21, 1989

[86] PCT No.: PCT/FR89/00127

§ 371 Date: Nov. 15, 1989

§ 102(e) Date: Nov. 15, 1989

[30] Foreign Application Priority Data

Mar. 22, 1988 [FR] France .................. 88 03683

[51] Int. Cl.$^5$ ........................................... H04M 11/00
[52] U.S. Cl. ........................................... 379/58; 379/63
[58] Field of Search ............................ 379/58–60, 379/63

[56] References Cited

U.S. PATENT DOCUMENTS

| | | | |
|---|---|---|---|
| 2,670,435 | 2/1954 | Mitchell | 379/58 |
| 3,808,537 | 4/1974 | Sarati et al. | 379/58 |
| 4,082,919 | 4/1978 | Day et al. | |
| 4,430,755 | 2/1984 | Nadir et al. | 379/58 |

FOREIGN PATENT DOCUMENTS 23091031  1/1976  France .
8701537   3/1987  World Int. Prop. O. .

OTHER PUBLICATIONS

Commutation & Transmission, vol. 7, No. 2, 1985, J. Cueugniet et al.: "Radiocom 2000 Reseau Multiservices De Radio-Telephonie", pp. 39–50.

Commutation & Transmission, vol. 8, No. 1, 1986, G. Banquet et al.: "Ramage, Un Reseau Radiotelephonique Mobile Prive", pp. 19–30.

Commutation & Transmission, vol. 9, No. 1, 1987, B. Fino et al.: "Les Radio-Communications Avec Les Mobiles", pp. 41–54.

Ericsson Review, vol. 64, No. B, 1987, L. Linden: "Private Mobile Radio Systems", pp. 50–54.

L'Onde Electrique, vol. 64, No. 6, Nov.–Dec. 1984, J.-C. Fabre et al.: "Le Reseau Saphir De La Gendarmerie Nationale", pp. 25–33.

Patent Abstracts of Japan, vol. 5, No. 51, Apr. 10, 1981, p. 723, E–51, & JP, A, 562753, Jan. 13, 1981.

Primary Examiner—Jin F. Ng
Assistant Examiner—Dwayne D. Bost
Attorney, Agent, or Firm—Oblon, Spivak, McClelland, Maier & Neustadt

[57] ABSTRACT

A device for setting up and routing telephone calls between subscribers of a radio-telephone network and/or a wired telephone network utilizes an automatic telephone exchange which is wired to the wired telephone exchange and connected to the radio-telephone network by a plurality of radio transceivers via a radio connecting unit. The radio connecting unit comprises a plurality of programmed processing units, each coupled respectively to a transceiver interface circuits, and a signal modem, controlled by the interface circuits. Each of the interface circuits have voice activity detectors for transmitting calls in an alternating mode between the subscribers of the radio-telephone network or between the subscribers of both networks. The programmed processing units are programmed with hierarchic restrictions to enable an organization of the radio-telephone subscribers into groups communicating on a same frequency and/or on a same transmission channel.

10 Claims, 29 Drawing Sheets

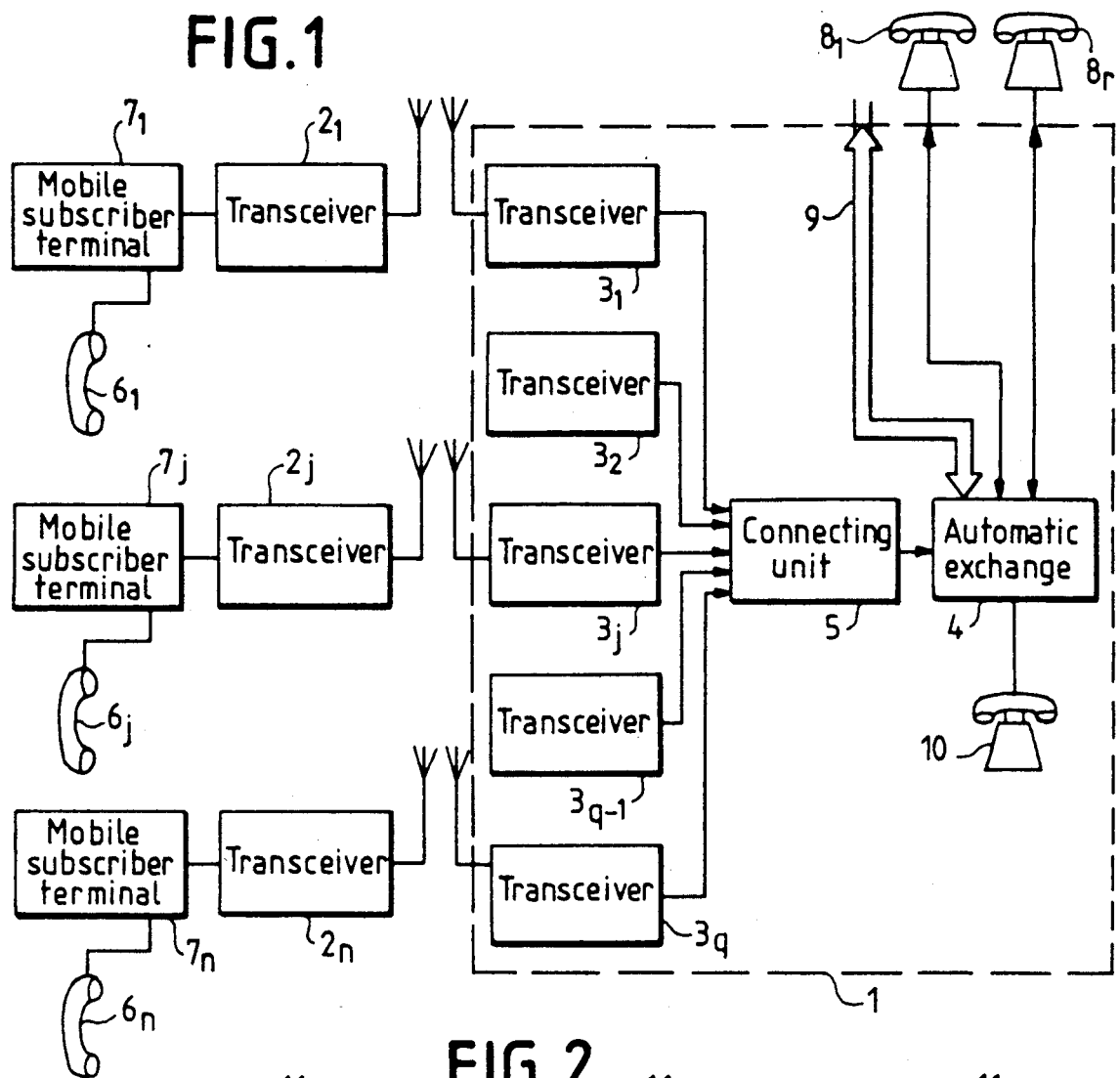
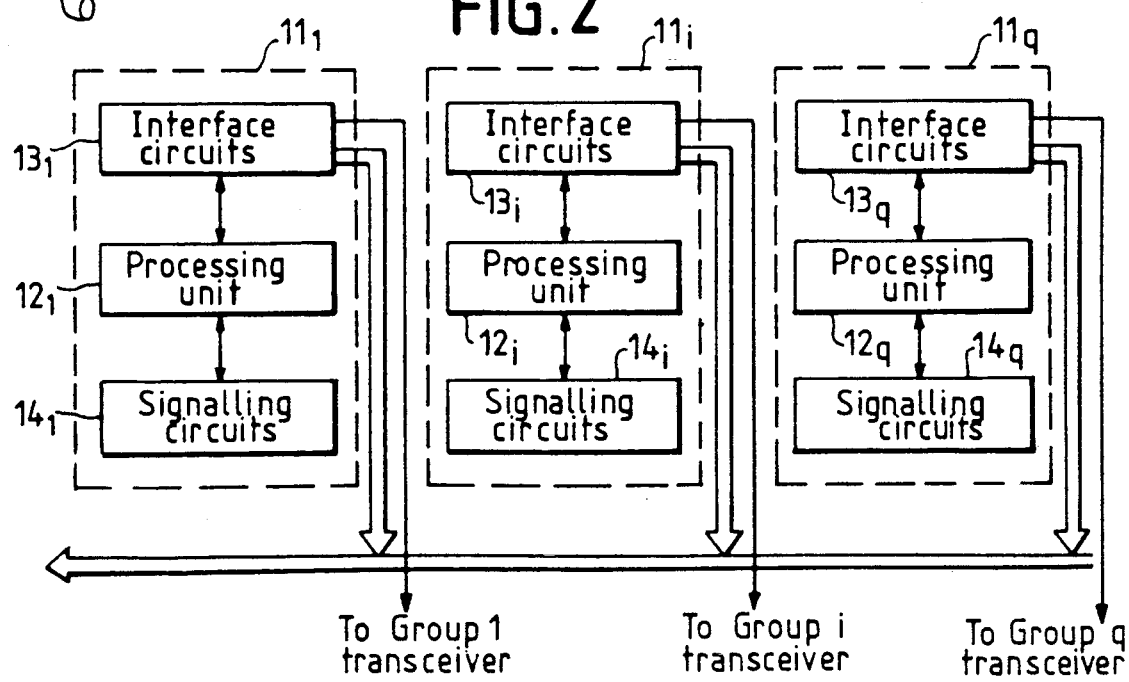

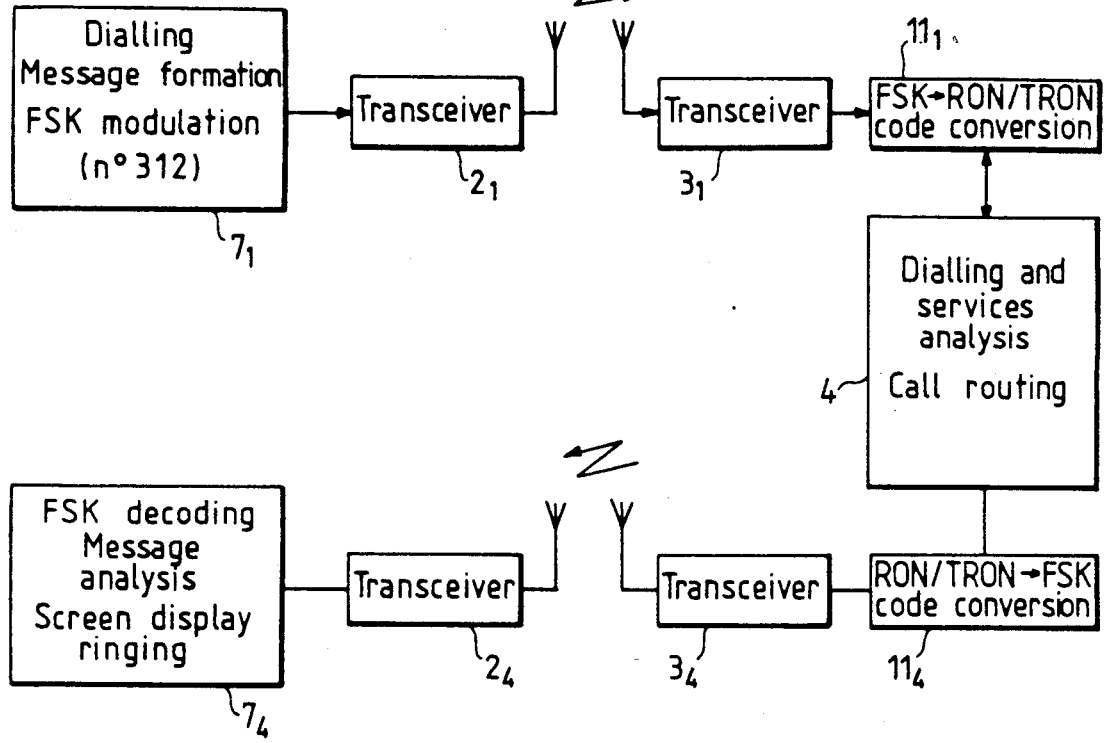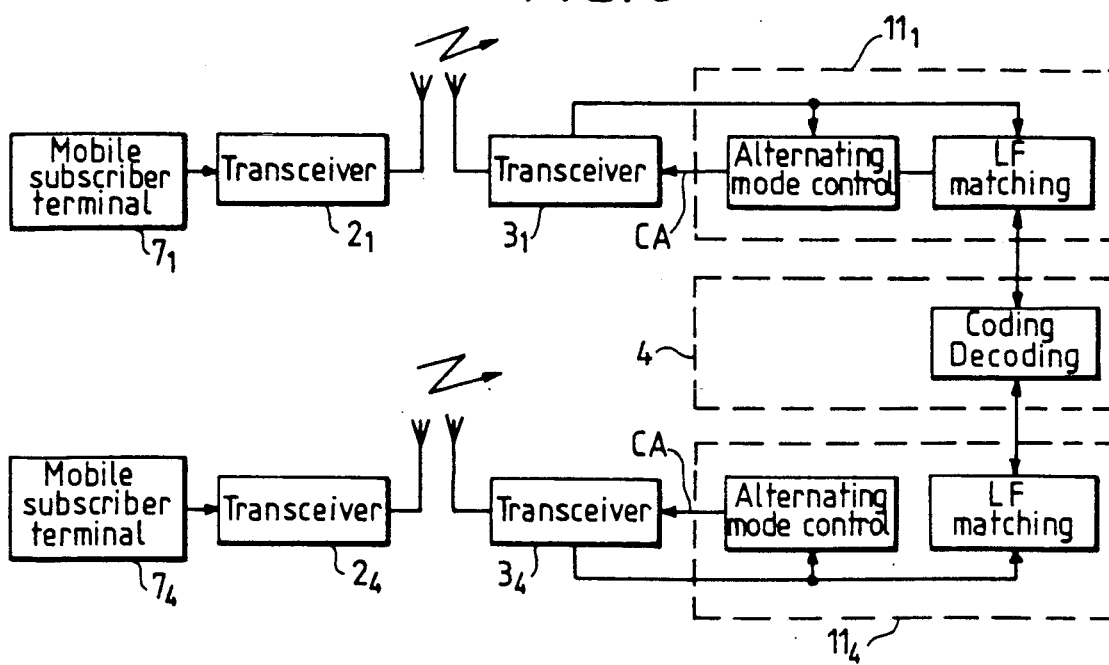

FIG. 8A

STATUS: R

| REQUEST | APSTR | APRDC | APCNF | APPDG | DECRO |
|---|---|---|---|---|---|
| RESPONSE | <-IMPUL (PRISE) | <-IMPUL (PRISE) | <-IMPUL (PRISE) | <-IMPUL (PRISE) | / |
| FINAL | 3.0 | 3.0 | 3.0 | 3.0 | R |
| REQUEST | FINPDG | FINCO | CIPHER | F_ALT | OUT |
| RESPONSE | <-LIBER FINPDG-> | / | / | / | <-LIBER |
| FINAL | R | R | R | R | R |
| REQUEST | IMPUL (PRISE) | NUMER | ACCEP | ABNIN | REBOU |
| RESPONSE | <-IMPUL (INVTR) | / | / | / | / |
| FINAL | 1 | R | R | R | R |
| REQUEST | LIBER | ABSAV | TEMPO | | |
| RESPONSE | / | / | / | | |
| FINAL | R | R | R | | |

FIG. 8B

STATUS: S

| REQUEST | APSTR | APRDC | APCNF | APPDG | DECRO |
|---|---|---|---|---|---|
| RESPONSE | REFUS 1 –> | / | <– LIBER<br><– IMPUL<br>(PRISE) | APRCP –> | / |
| FINAL | S | S | 3.0 | PEXTRA | S |
| REQUEST | FINPDG | FINCO<br>initiator | FINCO<br>CD1 or CD2 | FINCO<br>CDU U#1,2 | OUT |
| RESPONSE | <–LIBER<br>FINPDG–> | <– LIBER | <– LIBER<br>FINCO –> | / | <–LIBER<br>FINCO –> |
| FINAL | R | R | R | S | R |
| REQUEST | IMPUL | NUMER | ACCEP | ABNIN | REBOU |
| RESPONSE | / | / | / | / | / |
| FINAL | S | S | S | S | S |
| REQUEST | LIBER | ABSAV | TEMPO | CIPHER | F_ALT |
| RESPONSE | FINCO –> | <–LIBER<br>FINCO –> | / | CRYPTO–> | RAZ DAV |
| FINAL | R | R | S | S | S |

FIG. 8C

STATUS: CINTRA

| REQUEST | APSTR | APRDC | APCNF | APPDG | DECRO |
|---|---|---|---|---|---|
| RESPONSE | REFUS 1 → | / | / | ←LIBER<br>←IMPUL<br>(PRISE) | / |
| FINAL | CINTRA | CINTRA | CINTRA | 3.0 | CINTRA |
| REQUEST | FINPDG | FINCO<br>initiator | FINCO<br>CD1 or CD2 | FINCO<br>CDU U#1,2 | OUT |
| RESPONSE | ←LIBER<br>FINPDG→ | ←LIBER | ←LIBER<br>FINCO→ | / | ←LIBER<br>FINCO→ |
| FINAL | R | R | R | CINTRA | R |
| REQUEST | IMPUL | NUMER | ACCEP | ABNIN | REBOU |
| RESPONSE | / | / | / | / | / |
| FINAL | CINTRA | CINTRA | CINTRA | CINTRA | CINTRA |
| REQUEST | LIBER | ABSAV | TEMPO | CIPHER | F_ALT |
| RESPONSE | / | / | / | storage of<br>the mode | / |
| FINAL | CICTT | CINTRA | CINTRA | CINTRA | CINTRA |

FIG. 8D

STATUS: CICT

| REQUEST | APSTR | APRDC | APCNF | APPDG | DECRO |
|---|---|---|---|---|---|
| RESPONSE | REFUS 1 –> | / | <–LIBER <br> <–PRISE | <– LIBER <br> <– PRISE | / |
| FINAL | CICT | CICT | 3.0 | 3.0 | CICT |
| REQUEST | FINPDG | FINCO initiator | FINCO CD1 or CD2 | FINCO CDU U#1,2 | OUT |
| RESPONSE | <–LIBER <br> FINPDG–> | <–LIBER | <–LIBER | / | <–LIBER <br> FINCO –> |
| FINAL | R | R | R | CICT | R |
| REQUEST | IMPUL (PRISE) | NUMER | ACCEP | ABNIN | REBOU |
| RESPONSE | <–IMPUL (INVTR) | / | / | / | / |
| FINAL | 1C | CICT | CICT | CICT | CICT |
| REQUEST | LIBER | ABSAV | TEMPO | CIPHER | F_ALT |
| RESPONSE | / | / | / | storage of the mode | / |
| FINAL | CICTT | CICT | CICT | CICT | CICT |

FIG. 8E

STATUS: CICTT

| REQUEST | APSTR | APRDC | APCNF | APPDG | DECRO |
|---|---|---|---|---|---|
| RESPONSE | REFUS 1→ | / | / | ←LIBER<br>←PRISE | / |
| FINAL | CICTT | CICTT | CICTT | 3.0 | CICTT |
| REQUEST | FINPDG | FINCO<br>initiator | FINCO<br>CD1 or CD2 | FINCO<br>CDU U#1,2 | OUT |
| RESPONSE | ←LIBER<br>FINPDG→ | ←LIBER | ←LIBER | / | ←LIBER<br>FINCO→ |
| FINAL | R | R | R | CICTT | R |
| REQUEST | IMPUL<br>(PRISE) | NUMER | ACCEP | ABNIN | REBOU |
| RESPONSE | ←IMPUL<br>(INVTR) | / | / | / | / |
| FINAL | 1C | CICTT | CICTT | CICTT | CICTT |
| REQUEST | LIBER | ABSAV | TEMPO<br>(30 sec) | CIPHER | F_ALT |
| RESPONSE | ←IMPUL<br>(PRISE) | / | ←IMPUL<br>(PRISE) | storage of<br>the mode | / |
| FINAL | 3.0 | CICTT | 3.0 | CICTT | CICTT |

FIG. 8F

STATUS: CINSERT

| REQUEST | APSTR | APRDC | APCNF | APPDG | DECRO |
|---|---|---|---|---|---|
| RESPONSE | REFUS1 → | / | / | ← LIBER<br>← PRISE | / |
| FINAL | CINSERT | CINSERT | CINSERT | 3.0 | CINSERT |
| REQUEST | FINPDG | FINCO initiator | FINCO CD1 or CD2 | FINCO CDU U#1,2 | OUT |
| RESPONSE | ←LIBER<br>FINPDG → | ←LIBER | ←LIBER | / | ←LIBER<br>FINCO → |
| FINAL | R | R | R | CINSERT | R |
| REQUEST | IMPUL (PRISE) | NUMER | ACCEP | ABNIN | REBOU |
| RESPONSE | / | / | / | / | / |
| FINAL | CINSERT | CINSERT | CINSERT | CINSERT | CINSERT |
| REQUEST | LIBER | ABSAV | TEMPO | CIPHER | F_ALT |
| RESPONSE | ← IMPUL (PRISE) | / | / | storage of the mode | / |
| FINAL | 3.0 | CINSERT | CINSERT | CINSERT | CINSERT |

FIG. 8G

STATUS: CEXTRA

| REQUEST | APSTR | APRDC | APCNF | APPDG | DECRO |
|---|---|---|---|---|---|
| RESPONSE | REFUS1 → | / | / | ←LIBER<br>←PRISE | / |
| FINAL | CEXTRA | CEXTRA | CINSERT | 3.0 | CEXTRA |
| REQUEST | FINPDG | F_ALT | FINCO<br>CD1 or CD2 | FINCO<br>CDU U#1,2 | OUT |
| RESPONSE | ←LIBER<br>FINPDG→ | RAZ DAV | ←LIBER | / | ←LIBER<br>FINCO→ |
| FINAL | R | CEXTRA | R | CEXTRA | R |
| REQUEST | IMPUL<br>(PRISE) | NUMER | ACCEP | ABNIN | REBOU |
| RESPONSE | / | / | / | / | / |
| FINAL | CEXTRA | CEXTRA | CEXTRA | CEXTRA | CEXTRA |
| REQUEST | LIBER | ABSAV | TEMPO | CIPHER | |
| RESPONSE | FINCO → | / | / | CRYPTO→ | |
| FINAL | R | CEXTRA | CEXTRA | CEXTRA | |

FIG. 8H

STATUS: I

| REQUEST | APSTR | APRDC | APCNF | APPDG | DECRO |
|---|---|---|---|---|---|
| RESPONSE | REFUS1—> | / | <—LIBER <—IMPUL (PRISE) | <—LIBER <—IMPUL (PRISE) | / |
| FINAL | I | I | 3.0 | 3.0 | I |
| REQUEST | FINPDG | FINCO sub. in com | FINCO CD1 or CD2 | FINCO others | OUT |
| RESPONSE | <—LIBER FINPDG—> | <—LIBER | <—LIBER FINCO—> | / | <—LIBER FINCO—> |
| FINAL | R | R | R | I | R |
| REQUEST | IMPUL | NUMER | ACCEP | ABNIN | REBOU |
| RESPONSE | / | / | / | / | / |
| FINAL | I | I | I | I | I |
| REQUEST | LIBER | ABSAV | TEMPO (3mn) | CIPHER | F_ALT |
| RESPONSE | FINCO—> | / | <—LIBER | / | / |
| FINAL | R | I | II CT | I | I |

FIG.8I

STATUS: IICT

| REQUEST | APSTR | APRDC | APCNF | APPDG | DECRO |
|---|---|---|---|---|---|
| RESPONSE | <— IMPUL (PRISE) | <— IMPUL (PRISE) | <— IMPUL (PRISE) | <—LIBER FINCO —> <—IMPUL (PRISE) | / |
| FINAL | 3.0 | 3.0 | 3.0 | 3.0 | IICT |
| REQUEST | FINPDG | FINCO sub. in com | FINCO CD1 or CD2 | FINCO others | OUT |
| RESPONSE | <—LIBER FINPDG—> | <— LIBER | <—LIBER FINCO —> | / | <—LIBER FINCO—> |
| FINAL | R | R | R | I | R |
| REQUEST | IMPUL (PRISE) | NUMER | ACCEP | ABNIN | REBOU |
| RESPONSE | FINCO —> <—IMPUL (INVTR) | / | / | / | / |
| FINAL | 1 | IICT | IICT | IICT | IICT |
| REQUEST | LIBER | ABSAV | TEMPO | CIPHER | F_ALT |
| RESPONSE | / | / | / | / | / |
| FINAL | IICT | IICT | IICT | IICT | IICT |

FIG. 8J

STATUS: PINTRA

| REQUEST | APSTR | APRDC | APCNF | APPDG | DECRO |
|---|---|---|---|---|---|
| RESPONSE | REFUS 1→ | / | / | APPDG →  | / |
| FINAL | PINTRA | PINTRA | PINTRA | PINTRA | PINTRA |
| REQUEST | FINPDG | FINCO | CIPHER | F_ALT | OUT |
| RESPONSE | ←LIBER FINPDG→ | / | storage of the mode | / | ←LIBER FINPDG→ |
| FINAL | R | PINTRA | PINTRA | PINTRA | R |
| REQUEST | IMPUL | NUMER | ACCEP | ABNIN | REBOU |
| RESPONSE | / | / | / | / | / |
| FINAL | PINTRA | PINTRA | PINTRA | PINTRA | PINTRA |
| REQUEST | LIBER | ABSAV | TEMPO | | |
| RESPONSE | / | / | / | | |
| FINAL | PICTT | PINTRA | PINTRA | | |

FIG. 8K

STATUS: PEXTRA

| REQUEST | APSTR | APRDC | APCNF | APPDG | DECRO |
|---|---|---|---|---|---|
| RESPONSE | REFUS 1 —> | / | / | APRCP —> | / |
| FINAL | PEXTRA | PEXTRA | PEXTRA | PEXTRA | PEXTRA |
| REQUEST | FINPDG | FINCO | CIPHER | F_ALT | OUT |
| RESPONSE | <— LIBER FINPDG —> | / | CRYPTO —> | RAZ_DAV | <— LIBER FINPDG —> |
| FINAL | R | PEXTRA | PEXTRA | PEXTRA | R |
| REQUEST | IMPUL | NUMER | ACCEP | ABNIN | REBOU |
| RESPONSE | / | / | / | / | / |
| FINAL | PEXTRA | PEXTRA | PEXTRA | PEXTRA | PEXTRA |
| REQUEST | LIBER | ABSAV | TEMPO | | |
| RESPONSE | APPDG —> <— IMPUL (PRISE) | / | / | | |
| FINAL | 3.0 | PEXTRA | PEXTRA | | |

FIG. 8L

STATUS: PICTT

| REQUEST | APSTR | APROC | APCNF | APPDG | DECRO |
|---|---|---|---|---|---|
| RESPONSE | REFUS 1 -> | / | / | APPDG -> | / |
| FINAL | PICTT | PICTT | PICTT | PICTT | PICTT |
| REQUEST | FINPDG | FINCO | CIPHER | F_ALT | OUT |
| RESPONSE | <-LIBER FINPDG -> | / | storage of the mode | / | <-LIBER FINPDG -> |
| FINAL | R | PICTT | PICTT | PICTT | R |
| REQUEST | IMPUL (PRISE) | NUMER | ACCEP | ABNIN | REBOU |
| RESPONSE | <-IMPUL (INVTR) | / | / | / | / |
| FINAL | 1P | PICTT | PICTT | PICTT | PICTT |
| REQUEST | LIBER | ABSAV | TEMPO | | |
| RESPONSE | <-IMPUL (PRISE) | / | / | | |
| FINAL | 3.0 | PICTT | PICTT | | |

FIG.8M

STATUS: PINSERT

| REQUEST | APSTR | APRDC | APCNF | APPDG | DECRO |
|---|---|---|---|---|---|
| RESPONSE | REFUS 1 -> | / | / | APPDG -> | / |
| FINAL | PINSERT | PINSERT | PINSERT | PINSERT | PINSERT |
| REQUEST | FINPDG | FINCO | CIPHER | F_ALT | OUT |
| RESPONSE | <- LIBER FINPDG -> | / | CRYPTO -> | RAZ_DAV | <- LIBER FINPDG -> |
| FINAL | R | PINSERT | PINSERT | PINSERT | R |
| REQUEST | IMPUL | NUMER | ACCEP | ABNIN | REBOU |
| RESPONSE | / | / | / | / | / |
| FINAL | PINSERT | PINSERT | PINSERT | PINSERT | PINSERT |
| REQUEST | LIBER | ABSAV | TEMPO | | |
| RESPONSE | <- IMPUL (PRISE) | / | / | | |
| FINAL | 3.0 | PINSERT | PINSERT | | |

FIG. 8N

STATUS: 1

| REQUEST | APSTR | APRDC | APCNF | APPDG | DECRO |
|---|---|---|---|---|---|
| RESPONSE | REFUS 1→ | / | ←LIBER<br>←IMPUL<br>(PRISE) | ←LIBER<br>←IMPUL<br>(PRISE) | / |
| FINAL | 1 | 1 | 3.0 | 3.0 | .1 |
| REQUEST | FINPDG | FINCO<br>CD1 or CD2 | FINCO<br>others | CIPHER | OUT |
| RESPONSE | ←LIBER<br>FINPDG→ | ←LIBER | / | / | ←LIBER |
| FINAL | R | R | 1 | 1 | R |
| REQUEST | IMPUL | NUMER | ACCEP | ABNIN | REBOU |
| RESPONSE | / | ←ACCEP<br>APSTR→ | / | / | / |
| FINAL | 1 | 2 | 1 | 1 | 1 |
| REQUEST | LIBER | ABSAV | TEMPO<br>500 ms | F_ALT | |
| RESPONSE | / | / | ←LIBER | / | |
| FINAL | R | 1 | R | 1 | |

FIG. 80

STATUS: 1C

| REQUEST | APSTR | APRDC | APCNF | APPDG | DECRO |
|---|---|---|---|---|---|
| RESPONSE | REFUS 1 -> | / | / | <- LIBER<br><- IMPUL<br>(PRISE) | / |
| FINAL | 1C | 1C | 1C | 3.0 | 1C |
| REQUEST | FINPDG | FINCO CD1 or CD2 | FINCO initiator | FINCO others | OUT |
| RESPONSE | <- LIBER<br>FINPDG -> | <- LIBER<br>FINCO -> | <- LIBER | / | <- LIBER<br>FINCO -> |
| FINAL | R | R | R | 1C | R |
| REQUEST | IMPUL | NUMER with U=0 | NUMER with U≠0 | ACCEP | ABNIN |
| RESPONSE | / | <- ACCEP<br><- REPON | <- LIBER<br><- IMPUL<br>(PRISE) | / | / |
| FINAL | 1C | CINSERT | 3.0 | 1C | 1C |
| REQUEST | REBOU | LIBER | TEMPO 500 ms | F_ALT | ABSAV |
| RESPONSE | / | <- IMPUL<br>(PRISE) | <- LIBER<br><- IMPUL<br>(PRISE) | / | / |
| FINAL | R | 3.0 | 3.0 | 1C | 1C |
| REQUEST | CIPHER | | | | |
| RESPONSE | storage of the mode | | | | |
| FINAL | 1C | | | | |

FIG. 8P

STATUS: 1P

| REQUEST | APSTR | APRDC | APCNF | APPDG | DECRO |
|---|---|---|---|---|---|
| RESPONSE | REFUS1→ | / | / | APPDG→ | / |
| FINAL | 1P | 1P | 1P | 1P | 1P |
| REQUEST | FINPDG | FINCO | CIPHER | F_ALT | OUT |
| RESPONSE | ←LIBER FINPDG→ | / | storage of the mode | / | ←LIBER FINPDG→ |
| FINAL | R | 1P | 1P | 1P | R |
| REQUEST | IMPUL | NUMER with U=0 | NUMER with U≠0 | ACCEP | ABNIN |
| RESPONSE | / | ←ACCEP ←REPON | ←LIBER ←IMPUL (PRISE) | / | / |
| FINAL | 1P | PINSERT | 3.0 | 1P | 1P |
| REQUEST | REBOU | LIBER | TEMPO 30sec | ABSAV | |
| RESPONSE | / | ←IMPUL (PRISE) | ←LIBER ←IMPUL (PRISE) | / | |
| FINAL | R | 3.0 | 3.0 | 1P | |

FIG. 8Q

STATUS: 2

| REQUEST | APSTR | APRDC | APCNF | APPDG | DECRO |
|---|---|---|---|---|---|
| RESPONSE | REFUS 1 –> | / | <– LIBER<br><– IMPUL<br>(PRISE) | <– LIBER<br>FINCO –><br><– IMPUL<br>(PRISE) | <– REPON |
| FINAL | 2 | 2 | 3.0 | 3.0 | S |
| REQUEST | FINPDG | FINCO called | FINCO CD1 or CD2 | FINCO others | OUT |
| RESPONSE | <– LIBER<br>FINPDG–> | <– LIBER | <– LIBER<br>FINCO –> | / | <– LIBER<br>FINCO –> |
| FINAL | R | R | R | 2 | R |
| REQUEST | IMPUL | NUMER | ACCEP | ABNIN | REBOU |
| RESPONSE | / | / | / | / | / |
| FINAL | 2 | 2 | 2 | 2 | 2 |
| REQUEST | LIBER | ABSAV | TEMPO 1mn | CIPHER | F_ALT |
| RESPONSE | FINCO –> | / | FINCO –> | / | / |
| FINAL | R | 2 | R | 2 | 2 |

FIG.8R

STATUS: 3.0

| REQUEST | APSTR | APRDC | APCNF | APCNF | APPDG |
|---|---|---|---|---|---|
| Preceding STATUS | / | / | P xxxx | others | / |
| Preceding CALL | / | / | or APPDG | others | / |
| RESPONSE | REFUS 1 -> | / | / | Taking into account | Taking into account |
| FINAL | 3.0 | 3.0 | 3.0 | 3.0 | 3.0 |
| REQUEST | FINPDG | FINCO | FINCO CD1 or CD2 | FINCO initiator | FINCO others |
| Preceding STATUS | / | P xxxxx | Any status except Pxxx | Any status except Pxxx | / |
| Preceding CALL | / | or APPDG | Any call except APPDG | Any call except APPDG | / |
| RESPONSE | <-LIBER FINPDG-> | / | <-LIBER FINCO-> | <-LIBER | / |
| FINAL | R | 3.0 | R | R | 3.0 |
| REQUEST | CIPHER | CIPHER | F_ALT | OUT | OUT |
| Preceding STATUS | or P xxxx C xxxx | others | / | P xxxx | others |
| Preceding CALL | / | / | / | or APPDG | others |
| RESPONSE | storage of the mode | / | / | <-LIBER FINPDG-> | <-LIBER FINCO-> |
| FINAL | 3.0 | 3.0 | 3.0 | R | R |
| REQUEST | IMPUL (INVTR) | NUMER | ACCEP | ABNIN | REBOU |
| Preceding STATUS | / | / | / | / | / |
| Preceding CALL | / | / | / | / | / |
| RESPONSE | <-NUMDR | / | / | / | / |
| FINAL | 3.1 | 3.0 | 3.0 | 3.0 | 3.0 |

FIG. 8 S

STATUS: 3.0 (continued)

| REQUEST | LIBER | LIBER | LIBER | LIBER | ABSAV |
|---|---|---|---|---|---|
| Preceding STATUS | C xxxxx | P xxxxx | I | / | / |
| Preceding CALL | or APCNF | or APPDG | or APRDC | APSTR | / |
| RESPONSE | / | FINPDG → | / | REFUS 2 → | / |
| FINAL | CICT | R | IICT | R | 3.0 |
| REQUEST | TEMPO 30 sec | TEMPO 30 sec | TEMPO 30 sec | TEMPO 30 sec | DECRO |
| Preceding STATUS | CICTT | PICTT | I | / | / |
| Preceding CALL | or APCNF | or APPDG | or APRDC | APSTR | / |
| RESPONSE | / | FINPDG → | / | REFUS 2 → | / |
| FINAL | CICT | R | IICT | R | 3.0 |

FIG.8T

STATUS: 3.1

| REQUEST | APSTR | APRDC | APCNF | APCNF | APPDG |
|---|---|---|---|---|---|
| Preceding STATUS | / | / | Pxxxxx or Cxxxxx | others | Pxxxxx |
| Preceding CALL | / | / | or APPDG or APCNF | others | or APPDG |
| RESPONSE | REFUS 1–> | / | / | <–LIBER <–IMPUL (PRISE) | / |
| FINAL | 3.1 | 3.1 | 3.1 | 3.0 | 3.1 |
| REQUEST | APPDG | DECRO | FINCO CD1 or CD2 | FINCO initiator | FINCO others |
| Preceding STATUS | others | / | Any status except Pxxxx | Any status except Pxxxx | / |
| Preceding CALL | others | / | any call except APPDG | any call except APPDG | / |
| RESPONSE | <–LIBER <–IMPUL (PRISE) | / | <–LIBER FINCO –> | <–LIBER | / |
| FINAL | 3.0 | 3.1 | R | R | 3.1 |
| REQUEST | FINCO | CIPHER | CIPHER | OUT | OUT |
| Preceding STATUS | Pxxxx | Pxxxxx or Cxxxxx | others | PICTT | others |
| Preceding CALL | or APPDG | / | / | or APPDG | others |
| RESPONSE | / | storage of the mode | / | <–LIBER FINPDG–> | <–LIBER FINCO–> |
| FINAL | 3.1 | 3.1 | 3.1 | R | R |
| REQUEST | FINPDG | IMPUL (REFUS) | IMPUL (REFUS) | IMPUL (REFUS) | IMPUL (REFUS) |
| Preceding STATUS | / | Pxxxx | Cxxxx | IICT | / |
| Preceding CALL | / | or APPDG | or APCNF | or APRDC | APSTR |
| RESPONSE | <–LIBER FINPDG–> | <–LIBER FINPDG–> | <–LIBER | <–LIBER | REFUS 2–> |
| FINAL | R | R | CICT | IICT | R |

FIG. 8U

STATUS: 3.1 (continued)

| REQUEST | LIBER | LIBER | LIBER | LIBER | ABSAV |
|---|---|---|---|---|---|
| Preceding STATUS | C xxxx | P xxxxx | I | / | / |
| Preceding CALL | or APCNF | or APPDG | or APRDC | APSTR | / |
| RESPONSE | / | FINPDG → | / | REFUS 2 → | / |
| FINAL | CICT | R | IICT | R | 3.0 |
| REQUEST | TEMPO 30 sec | TEMPO 30 sec | TEMPO 30 sec | TEMPO 30 sec | REBOU |
| Preceding STATUS | C xxxx | P xxxxx | I | / | / |
| Preceding CALL | or APCNF | or APPDG | or APRDC | APSTR | / |
| RESPONSE | / | FINPDG → | / | REFUS 2 → | / |
| FINAL | CICT | R | IICT | R | 3.1 |
| REQUEST | ACCEP | ABNIN | F_ALT | NUMER | |
| Preceding STATUS | / | / | / | / | |
| Preceding CALL | / | / | / | / | |
| RESPONSE | ← NUMDE | ← NUMDE | / | / | |
| FINAL | 3.2 | 3.2 | 3.1 | 3.1 | |

FIG. 8V

STATUS: 3.2

| REQUEST | APSTR | APRDC | APCNF | APCNF | APPDG |
|---|---|---|---|---|---|
| Preceding STATUS | / | / | Pxxxxx or Cxxxxx | others | Pxxxx |
| Preceding CALL | / | / | or APPDG or APCNF | others | or APPDG |
| RESPONSE | REFUS1→ | / | / | ←LIBER ←IMPUL (PRISE) | / |
| FINAL | 3.2 | 3.2 | 3.2 | 3.0 | 3.2 |
| REQUEST | APPDG | DECRO | FINCO CD1 or CD2 | FINCO initiator | FINCO others |
| Preceding STATUS | others | / | Any status except Pxxxx | Any status except Pxxxx | / |
| Preceding CALL | others | / | any call except APPDG | any call except APPDG | / |
| RESPONSE | ←LIBER ←IMPUL (PRISE) | / | ←LIBER FINCO→ | ←LIBER | / |
| FINAL | 3.0 | 3.2 | R | R | 3.2 |
| REQUEST | FINCO | CIPHER | CIPHER | OUT | OUT |
| Preceding STATUS | Pxxxxx | Pxxxxx or Cxxxx | others | Pxxxx | others |
| Preceding CALL | or APPDG | / | / | or APPDG | others |
| RESPONSE | / | storage of the mode | / | ←LIBER FINPDG→ | ←LIBER FINCO→ |
| FINAL | 3.2 | 3.2 | 3.2 | R | R |
| REQUEST | FINPDG | IMPUL (REFUS) | IMPUL (REFUS) | IMPUL (REFUS) | IMPUL (REFUS) |
| Preceding STATUS | / | Pxxxxx | Cxxxxx | / | / |
| Preceding CALL | / | or APPDG | or APCNF | APRDC | APSTR and ACCEP |
| RESPONSE | ←LIBER FINPDG→ | ←LIBER FINPDG→ | ←LIBER | ←LIBER | REFUS2→ ←LIBER |
| FINAL | R | R | CICT | IICT | R |

FIG. 8W

STATUS: 3.2 (continued)

| REQUEST | IMPUL (REFUS) | LIBER | LIBER | LIBER | LIBER |
|---|---|---|---|---|---|
| Preceding STATUS | / | Pxxxxx | I | / | Cxxxxx |
| Preceding CALL | ABNIN and APSTR | or APPDG | or APRDC | APSTR | or APCNF |
| RESPONSE | <- LIBER REFUS 3 -> | FINPDG -> | / | REFUS 2 -> | / |
| FINAL | CICT | R | IICT | R | CICT |
| REQUEST | TEMPO 30 sec | TEMPO 30 sec | TEMPO 30 sec | TEMPO 30 sec | NUMER |
| Preceding STATUS | Cxxxxx | Pxxxxx | I | / | Pxxxxx |
| Preceding CALL | or APCNF | or APPDG | or APRDC | APSTR | or APPDG |
| RESPONSE | / | FINPDG -> | / | REFUS 2 -> | <- LIBER FINPDG -> |
| FINAL | CICT | R | IICT | R | R |
| REQUEST | NUMER | NUMER | NUMER | ACCEP | ACCEP |
| Preceding STATUS | / | Cxxxxx | / | Pxxxx | Cxxxxx |
| Preceding CALL | APSTR | or APCNF | APRDC | or APPDG | or APCNF |
| RESPONSE | <- LIBER REFUS 2 -> | <- LIBER | <- LIBER | <- LIBER FINPDG -> | <- LIBER |
| FINAL | R | CICT | IICT | R | CICT |
| REQUEST | ACCEP | ACCEP | REBOU | REBOU | REBOU |
| Preceding STATUS | / | / | / | / | Cxxxxx |
| Preceding CALL | APSTR | APRDC | APSTR | or APRDC | or APCNF |
| RESPONSE | AC_SER -> | <- LIBER | APINT -> | / | / |
| FINAL | 4 | IICT | I | I | CINTRA |

FIG. 8X

STATUS: 3.2 (continued)

| REQUEST | REBOU | ABNIN | ABNIN | ABNIN | ABNIN |
|---|---|---|---|---|---|
| Preceding STATUS | PICTT or PINSERT | / | Pxxxxx | Cxxxxx | / |
| Preceding CALL | or APPDG | APSTR | or APPDG | or APCNF | APRDC |
| RESPONSE | APPDG —> | REFUS 4 —> <—LIBER | <— LIBER FINPDG —> | <— LIBER | <— LIBER |
| FINAL | PINTRA | R | R | CICT | IICT |
| REQUEST | ABSAV | F_ALT | | | |
| Preceding STATUS | / | / | | | |
| Preceding CALL | / | / | | | |
| RESPONSE | / | / | | | |
| FINAL | 3.2 | 3.2 | | | |

FIG. 8Y

STATUS: 4

| REQUEST | APSTR | APRDC | APCNF | APPDG | DECRO |
|---|---|---|---|---|---|
| RESPONSE | REFUS 1 —> | / | <— LIBER <— IMPUL (PRISE) | <— LIBER FINCO —> <— IMPUL (PRISE) | / |
| FINAL | 4 | 4 | 3.0 | 3.0 | 4 |
| REQUEST | FINPDG | FINCO initiator | FINCO CD1 or CD2 | FINCO others | OUT |
| RESPONSE | <— LIBER FINPDG —> | <— LIBER | <— LIBER FINCO —> | / | <— LIBER FINCO —> |
| FINAL | R | R | R | 4 | R |
| REQUEST | IMPUL (REPON) | NUMER | ACCEP | ABNIN | REBOU |
| RESPONSE | DECRO —> | / | / | / | / |
| FINAL | S | 4 | 4 | 4 | 4 |
| REQUEST | LIBER | ABSAV | TEMPO 2mn | CIPHER | F_ALT |
| RESPONSE | FINSERV —> | / | <— LIBER FINCO —> | / | / |
| FINAL | R | 4 | R | 4 | 4 |

DEVICE FOR THE SETTING UP AND ROUTING OF TELEPHONE CALLS BETWEEN SUBSCRIBERS OF A RADIO NETWORK AND/OR OF A WIRED TELEPHONE NETWORK

The present invention relates to a device for the setting up of telephone calls between subscribers of a radio network and/or of a wired telephone network.

It applies in particular to the field of military radiocommunications where it enables the automatic integration of the combat radio with the existing telephone networks by making the various tactical radio means HF, VHF and VHF/UHF dependent.

In the known military radiocommunications systems, the setting up of calls between a radio network and a cabled or wired telephone network is carried out manually by an operator who sets up, by means of a connecting panel, the links between the transceivers of the radio network and the transmission lines of the wired telephone network. In addition to the fact that this mode of operation requires the operator to carry out complicated manual procedures, these systems appear antiquated and unsuitable for taking account of the rapid evolution of situations on the battlefield, in particular they do not enable the rapid routing or collection of information and do not provide any effective protection against enemy countermeasures.

The object of the invention is to overcome the above-mentioned disadvantages.

For this purpose, the object of the invention is a device for the setting up and routing of telephone calls between subscribers of a radio network and/or of a wired telephone network in which the subscribers of the radio network have radio transceiver sets operating in alternating mode and the subscribers of the two networks have dialling means in order to call their correspondents, of the type comprising an automatic telephone exchange coupled with the wired telephone network by means of wired telephone lines, the automatic exchange being coupled to the radio telephone network by means of a plurality of radio transceivers via a connecting unit comprising means of detection of voice activity in order to enable the transmission of the calls in an alternating mode between the subscribers of the radio telephone network on the one hand and between the subscribers of both networks on the other hand, and means of selection sensitive to the dialling means of the subscribers of both networks in order to automatically set up telephone calls between all of the subscribers, characterized in that the means of selection comprise a plurality of programmed processing units each connected to a transceiver coupling the automatic exchange to the radio network and in that each processing unit is programmed to enable an organization of the radio subscriber network into groups of radio subscribers communicating on a same frequency and/or on a same transmission channel, the calls being able to take place between subscribers in a same group or between subscribers belonging to different groups.

An advantage of the invention is that it enables, in radiocommunication systems, a horizontal and vertical coordination to be provided between the subscribers of the radio network and those of the wired network.

On the technical side it enables, in an entirely automatic way, the setting up of calls between radio sets operating in alternating mode and wired telephone sets, the radio links being able to be encoded or not encoded at the choice of the radio subscriber.

On the functional side it provides the command with controllable and adjustable capabilities for the automatic setting up of calls, by simple dialling of users belonging to two different populations, for example the telephone subscribers of one command station with the radio correspondents of one or more combat networks.

By means of the invention, the telephone subscribers to the wired network have on the one hand, between them, all of the facilities offered by the automatic exchange, i.e. possibilities of access to external switched networks or possibilities of obtaining calls in duplex, and on the other hand the telephone subscribers of the wired network have, between them and the radio correspondents, calls set up in alternating mode in order to facilitate the transmission of orders and reports under the control of their hierarchy.

Also by means of the invention, the radio correspondents have on the one hand, between them, while always complying with the operational and hierarchic restrictions relating to the operation of a combat network, the possibility of setting up calls in alternating mode in order to set up, by relaying links between heterogeneous networks for example, the creation of networks to suit the circumstances, or to lighten the supervision of operators of a same network and, on the other hand, between them and the telephone subscribers, calls in alternating mode in order to facilitate the transmission of commands and reports under hierarchic control.

Other characteristics and advantages of the invention will appear hereafter with the help of the following description given with reference to the appended drawings in which:

FIG. 1 shows an embodiment of a device according to the invention;

FIG. 2 is a simplified general block diagram of a connecting unit as shown in FIG. 1;

FIG. 5 shows an example of setting up an inter-group radio call;

FIG. 6 is an example illustrating an established inter-group radio call;

FIGS. 8A to 8Y are an example of programming a connecting unit according to the invention.

Figure 3:
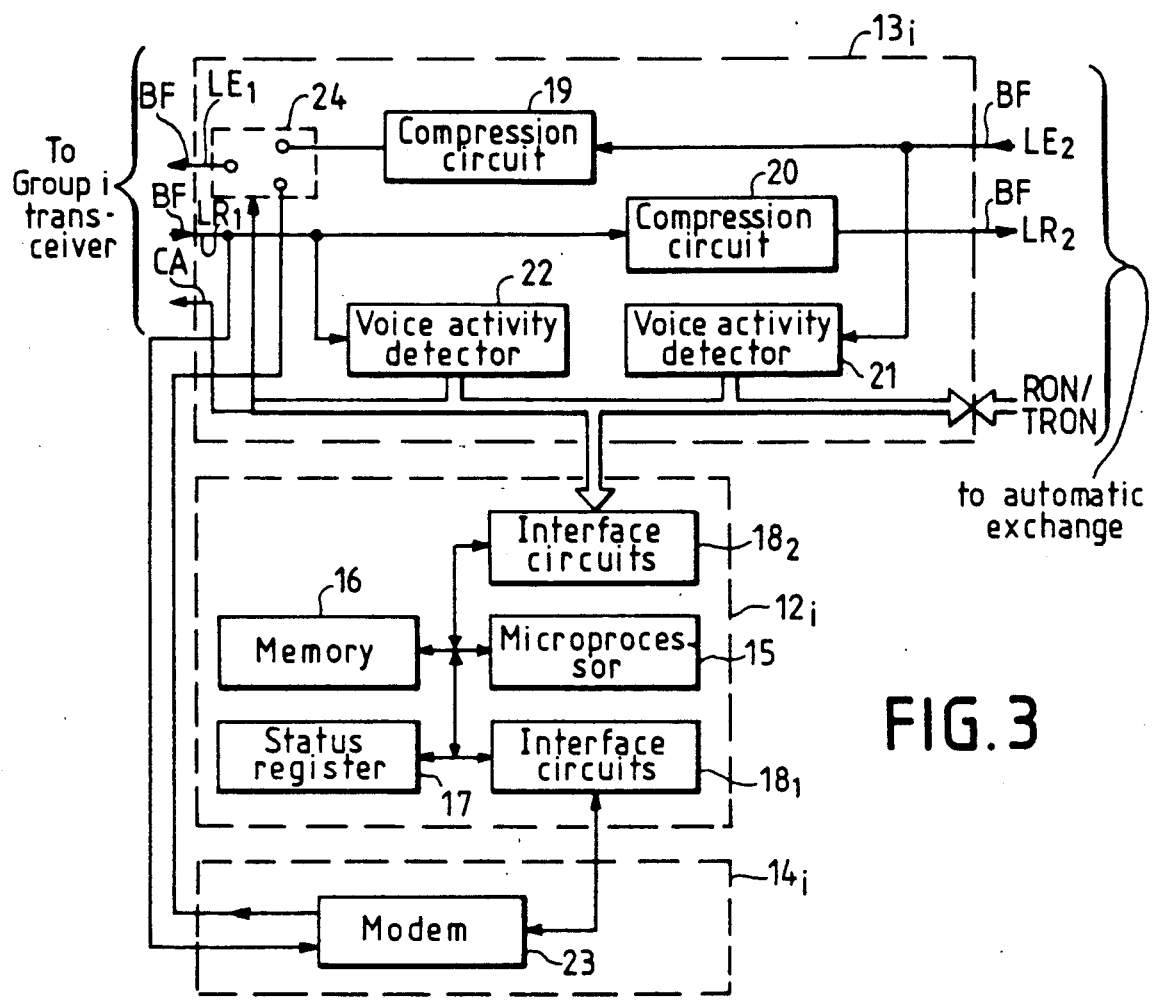
FIG. 3 shows an embodiment of a group coupling unit forming the connecting unit of FIG. 2.

The device according to the invention which is shown in FIG. 1 comprises a connecting station 1 shown inside a dotted line, coupled by radio channels operating in alternating mode to a set of n radio transceiver sets referenced $2_l$ to $2_n$.

The connecting station 1 comprises a set of q transceivers referenced $3_l$ to $3_q$ coupled to a digital automatic telephone exchange 4 via a connecting unit 5.

The radio transceivers $2_l$ to $2_n$ are coupled to telephone handsets referenced $6_l$ to $6_n$ via mobile subscriber terminals respectively referenced $7_l$ to $7_n$ constituted like a telephone set by means of dialling keypads.

The digital automatic exchange 4 is composed in a known way of a microprogrammed processing unit connected to wired telephone sets of local subscribers respectively referenced $8_l$ to $8_r$. It is also connected to an external switched telephone network, which is not shown, by external telephone lines 9 and to a telephone handset 10 which can be used directly by the operator of the station 1.

The users of the connecting station 1 are composed of wired subscribers and radio correspondents.

The wired subscribers have at their disposal the telephone sets $8_l$ to $8_r$ and can benefit between them or between them and the subscribers of external switched networks from all of the services which a private automatic telephone exchange can offer namely:

automatic calling of the correspondent (except for calls coming from the external switched network), forwarding, putting on hold, transfer, putting subscribers into the absent/present state, automatic recall, automatic access to another automatic exchange of the same type by prefix and self-adaptive routing, by abbreviated dialling and by priority. The wired subscribers can thus, by simple dialling, set up a call with one of the transceivers $3_l$ to $3_q$ of the station 1 in order to have access to a combat network having transceivers $2_l$ to $2_n$. In this case they must then, even when using a standard telephone set, comply with the normal operating rules of a combat radio network working in alternating mode, namely:

the originator speaks first, the originator checks before speaking that there is no conversation in progress, the person speaking giving a spoken indication at the end of his speech, the speech must be of shorter duration than a duration which is determined by the normal radio operating rules.

In a more particular operating framework of the invention the sets of the radio subscribers of a station 1 can be grouped into groups, each group being defined by a set of radio subscribers having on the one hand transceivers $2_l$ to $2_n$ operating on a same frequency if the sets in use have fixed frequencies, or on a same radio channel with frequency changing (EVF) if the radio sets used can work on different frequency levels. Under these conditions a group will be said to be connected to the station 1 if one of the transmitters of station 1 is set on its frequency or on its channel and if its identification number is entered by the operator into the automatic exchange of station 1.

The advantage of dividing the transceivers $2_l$ to $2_n$ into radio groups is that it enables the formation of several combat radio networks, i.e. the collecting together of operational correspondents able to communicate without delay between each other within a same network for the purpose of carrying out the same mission. However, the device of FIG. 1 also enables the formation of radio groups from isolated correspondents which do not specially have to communicate between each other but who are grouped on a same channel for frequency management or economic purposes between transceivers at the level of station 1.

The use of mobile subscriber terminals $7_l$ to $7_n$ enables radio subscribers to initiate calls through station 1 and to benefit from the same services as the wired telephone subscribers, namely the automatic calling of wired subscribers or of the radio subscribers of the network connected to the station, or forwarding, putting subscribers in the absent/present state, abbreviated dialling, priority etc . . .

On the other hand, all the members of a group can be called by a telephone subscriber connected to station 1 even if they do not all have a mobile subscriber terminal $7_l$ to $7_n$, but the latter must in this case continuously monitor their receiver.

The connecting unit shown in FIG. 2 comprises q group coupling units $11_i$, shown inside dotted rectangles, respectively comprising a processing unit $12_i$, an interface circuit $13_i$ and a signalling device $14_i$. An embodiment of a group coupling unit $11_i$ is shown in FIG. 3. The elements $12_i$, $13_i$, and $14_i$ of this unit are shown inside a closed dotted line. The element $12_i$ comprises, organized in a known way about a microprocessor 15: a program and data memory 16, a status register 17 and interface circuits $18_1$ and $18_2$ to enable the transfer of control data between the interface circuit $13_i$ and the signalling device $14_i$. The interface circuit $13_i$ provides for the transmission of speech at constant level on transmission lines ($LE_1$, $LE_2$) and reception lines ($LR_l$, $LR_2$) between a transceiver set $3_i$ of the station 1 and the automatic telephone exchange 4 and comprises speech signal compression circuits 19 and 20 and voice activity detectors for transmission and reception 21 and 22 respectively. The signalling device $14_i$ comprises an FSK signals modem 23 (FSK being the English abbreviation for "Frequency Shift Keying") which provides the coupling between the interface circuits $18_i$ of the microprocessor 15 and the transmission lines $LE_l$ and reception lines $LR_l$ for the speech signals connecting the interface circuit $18_l$ to the transceiver $3_i$. The coupling of the modem 23 or of the compression circuit 24 to the transmission line $LE_l$ takes place through a switch 24 controlled by the interface circuits $18_l$. Each element described previously and forming a group coupling unit $11_i$ is among the known elements of the prior art and its embodiment does not need to be explained in greater detail.

Each coupling unit $11_i$ is connected to the telephone exchange 4 by means of signalling lines RON and TRON which carry the signalling signals in both directions between the automatic exchange 4 and the connecting unit 5.

The signalling messages exchanged with the automatic exchange 4 are applied to the microprocessor via interface circuits $18_2$. The signalling messages are encoded in the form of a combination of elementary pulses corresponding to the different types of messages exchanged.

The messages exchanged on the RON TRON line are for example as follows:

PRISE: line occupancy message
INVTR: invitation to transmit a number
ABNIN: indication of non-registered subscriber
ACCEP: acceptance of a service request
REFUS: refusal of a service request
REBOU: radio loop information
REPON: requested subscriber reply
LIBER: line release message
NUMDE: service request number (1 to 9 figures).
NUMDR: number of called radio subscriber (3 figures).
NUMER: number of called radio subscriber (3 figures).

The messages PRISE, INVTR, REFUS and REPON are encoded by the microprocessor 15 and/or the digital automatic exchange 4 according to the French "NEF" standard in the form of a single pulse of nominal duration 100 milliseconds. The ACCEP message is encoded by the microprocessor 15 and/or the automatic exchange 4 in the form of 2 pulses of duration 100 milliseconds separated by a blank of 100 milliseconds. The ABNIN, REBOU and LIBER messages are encoded by the microprocessor 15 and/or the automatic exchange 4 in the form of a pulse of nominal duration of 200, 350 and 625 milliseconds respectively. The NUMDE, NUMDR and NUMER messages are encoded by means of 1 to 10 pulses at the rate of 10 periods per second, two consecutive digits being separated by a blank of 150 milliseconds.

Under these conditions the opening of a line to an originator is carried out as follows: The PRISE message is sent by the originator, and the called subscriber responds with the INVTR message after a time of between 150 and 200 milliseconds.

If the originator is the connecting unit 5, the latter supplies the number of the originating subscriber NUMDR after a delay which can vary between 0 and 150 milliseconds after reception of the INVTR message. The exchange 4 responds within a period of 150 milliseconds with a report message of the ACCEP, REFUS or originator not registered type.

In the case of REFUS the connecting unit 5 responds with a release message LIBER within a period of 150 milliseconds.

In the two other cases (acceptance or originator not registered) the connecting unit issues a service request within a period of 150 milliseconds.

If the originator is the automatic exchange 4, the latter supplies the number of the called subscriber NUMER within a period of 0 to 150 milliseconds after reception of the INVTR signal. The connecting unit responds within a period of 150 milliseconds with an acceptance message ACCEP.

The request for service is performed by transmitting the NUMDE message which is responded to within a period of about 150 milliseconds with an acceptance report message ACCEP or a REFUS message, or even a called subscriber not registered or loop (REBOU) message.

In the case of acceptance, the originator of the call waits for a response message (REPON) which must return to him within a determined time. Finally, the closing of the line can be carried out at any time by one or other of the equipments. It is carried out by the transmission of the LIBER message.

Figure 4:
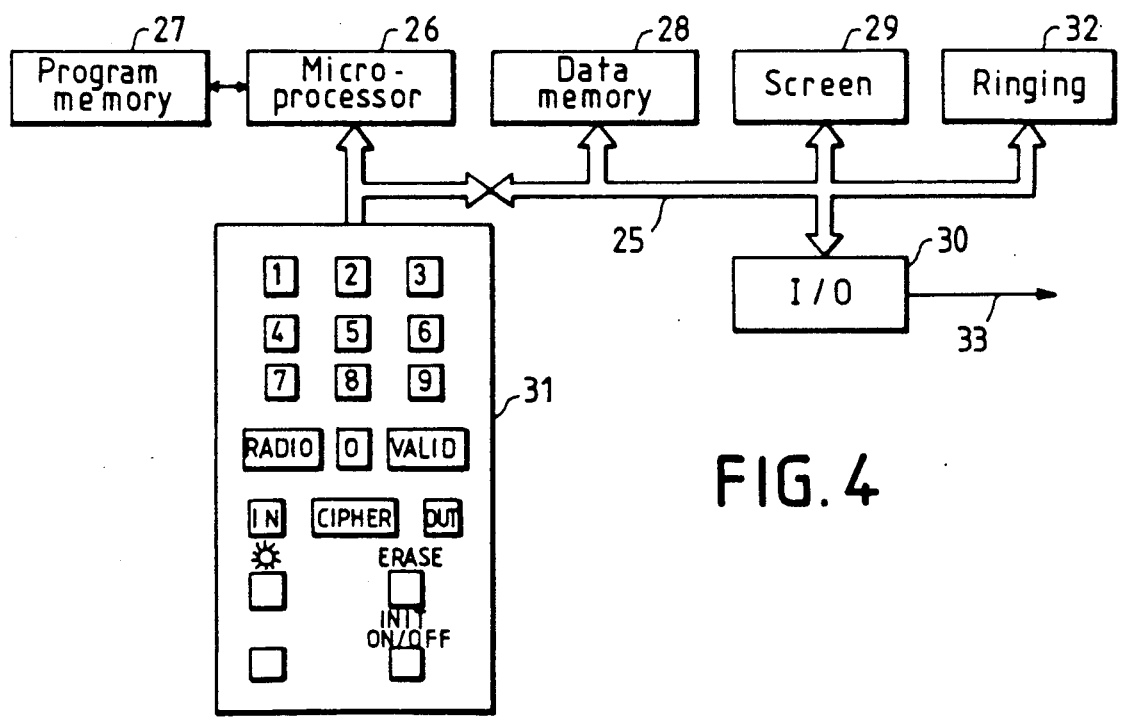
FIG. 4 shows the organization of a keypad of the mobile subscriber terminal of the device shown in FIG. 1.

An example of embodiment of a mobile terminal $7_i$ is shown in FIG. 4. It comprises, organized in a known way about an address and data bus 25, a microprocessor 26 and its program memory 27, a data memory 28, a display screen 29, an input/output port 30, a dialling keypad assembly 31 and a memory 32. The port 30 is connected by a cable 33 to the corresponding transceiver $7_i$. The dialling keypad assembly 31 comprises, in a way similar to telephone dialling buttons, a set of 10 dialling keys, numbered 0 to 9, a set of 6 function keys which are:

a RESCUE/INIT key, an IN key, an OUT/ERASE key, a RADIO key, a VALID key and a CIPHER key.

The RESCUE/INIT key is used for initializing the mobile subscriber terminal $7_i$ or for operating the collection procedures. The IN key enables the stopping of the ringing of the mobile subscriber terminal $7_i$ and generates a call request acknowledgement signal to the station 1. The OUT/ERASE key signals the end of communications and cancels the previously pressed keys. The RADIO key enables the execution of recalls within a same group and enables the implementation of group protection. The VALID key enables the sending of messages to be validated. Finally, the CIPHER key enables the management of the cryptophonic functioning of the transceivers $2_i$ when the latter are provided with encoding devices.

The function of a mobile terminal $7_i$ is to provide the signallings necessary for the setting up of a call, either directly from terminal to terminal or between a terminal and its connecting station 1 (call between two separate groups or between a group and a wired subscriber). It also enables the user to be supplied with the tones and visual indications on a display screen 23 in order to enable him to monitor the procedures.

The dialling principle is as follows. Whoever the wired subscriber of the telephone network or the radio correspondent of a connecting station may be, he is identified by the station 1 by a personal number of 5 or 6 digits QMCDU where QM represents the code of the connecting station and CDU represents the number of the subscriber or correspondent. By way of indication, for a wired subscriber or an isolated radio correspondent, the number CDU can be a three-digit identification number. For the radio correspondents the figures CD correspond to the identification of their group, these figures being provided to the station during the registration of the group. The figure U corresponds to their number, for example within the range 1 to 9, within their group which they indicate when initializing the mobile subscriber terminal $7_i$. In this case the FIGS. 1 and 2 can refer, at procedural level, to a network chief and his assistant for example.

The registration of subscribers in the memory 16 of the connecting unit takes place as follows. For a wired subscriber of the telephone network the identification number must be provided in the operator's directory and registered in the memory 16 of the connecting station with its characteristics of priority, of authorization or non-authorization for exiting the network, forwarding authorized or not authorized and actual registration or registration to be confirmed. For the radio subscribers, the registration carried out by the operator of the station 1 is an overall registration per group (identical CD) with preprogrammed characteristics such as CD1 with priority 2 for a network chief, CD0 to allow a collective call from the group with priority No 1 and CD2 to 9 for each member of the network with priority 1, all having the possibility of authorized forwarding and actual registration. The radio subscribers also have, like the wired subscribers, use of the facility of declaring themselves as absent subscribers by dialling on the keypad of a mobile terminal $7_i$ the code 8CDU VALID, or possibly the code 7CDU VALID for the re-registration with absent subscribers. In general, the following different prefixes can be used: 0 for connecting to the operator of the station 1, 1 for making a call to an external switched network, 7 to enable calls between subscribers of a same station or re-registration after having been placed as absent subscribers, 2 for calls between subscribers of different stations, 8 for registration as absent subscribers and 9 for making a request for implementation of the priority allocated to the user.

Figure 7:
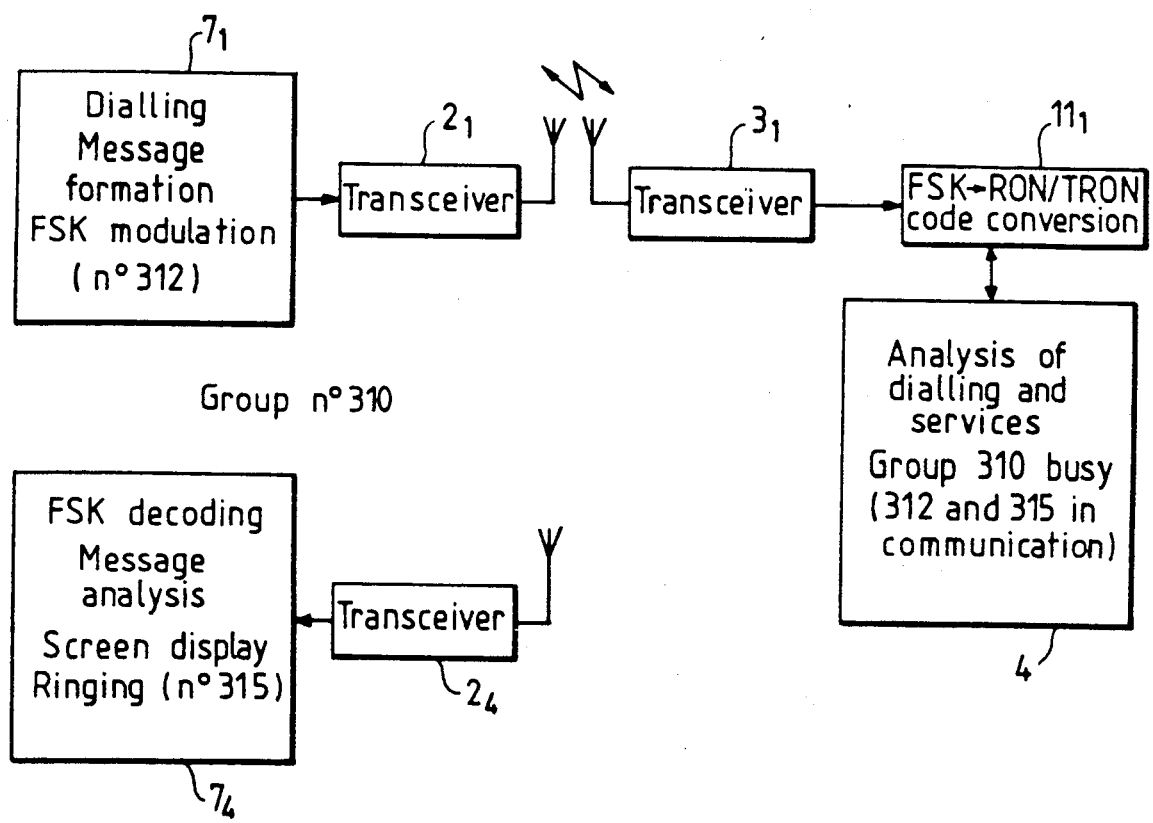
FIG. 7 is an example to illustrate an intragroup call.

An example of a call between subscribers of the radio network is illustrated in FIGS. 5, 6 and 7. FIG. 5 shows a simplified functional block diagram of the setting up of a call between radio subscribers one of whom has a mobile subscriber terminal $7_i$ and the other of whom has the subscriber terminal $7_4$, the subscriber having the terminal $7_i$ dialling the number of the terminal $7_4$. The subscriber of the mobile subscriber terminal $7_4$ which is called unhooks and sends the corresponding information to the automatic telephone exchange 4 via a group coupling unit 11₄, which has the effect of setting up the call between the two subscribers and authorizing the voice transmission link between the transceivers of the two subscribers and the station 1. The call which is set up complies with the functional block diagram shown in FIG. 6. In this figure the exchanges between the correspondents takes place according to the normal radio procedure in the alternating mode between each subscriber transceiver and the channels corresponding to the group coupling units 11₁ and 11₄. The station 1 therefore functions as a relay. The alternations of the transceiver sets are then controlled by the detection of voice activity by the receive and transmit voice activity detectors. The call is stopped by the hanging up of one of the two correspondents. Finally, FIG. 7 shows an example of an intra-group radio call. This example corresponds to the case in which a subscriber having the number 312 calls another subscriber having the number 315 in group No 310. In this case the signalling exchanges take place between the mobile terminals of each of the subscribers but the station 1 intercepts the signalling of the mobile subscriber terminal 312 which is registered in the automatic telephone exchange 4 in order to indicate that group 310 is busy.

The above functionings can be obtained by programming each microprocessor 12ᵢ of a connecting unit according to a pattern having thirteen stable states in which it can remain indefinitely and 8 unstable states from which it must exit at the end of a certain time in order to avoid blocking the operations in progress. At any moment the state of an operation in progress executed by a microprocessor is registered in its status register 17. The stable states are as follows:

R is the rest state (no call is in progress)

S is the state which enables it to be signalled that an extra-group call is in progress CINTRA is the state which enables it to be signalled that a general intra-group call in progress is declared to the automatic exchange 4

CICT is the state which enables it to be signalled that a general intra-group call in progress is unknown to the automatic exchange 4

CICTT is the state which enables it to be signalled that a general intra-group call in progress is unknown to the automatic exchange and is temporarily. awaiting entry CINSERT is the state which enables it to be signalled that a general intra-group call is taking place with an extra-group subscriber CEXTRA is a state which enables it to be signalled that a general extra-group call is in progress at the initiative of a subscriber external to the group I is the state which enables it to be signalled that an individual intra-group call is in progress IICT is the state which enables it to be signalled that an individual intra-group call in progress is unknown to the automatic exchange 4

PINTRA is the state which signals that a group which is in communication is protected from any insertion PEXTRA is the state signalling that a system of protected circumstances is created PICTT is the state which signals that a group in communication is protected and is unknown to the automatic exchange 4 temporarily until the arrival of an insertion finally, PINSERT is the state which signals the fact that an extra-group subscriber is inserted into the communications of a group.

The eight unstable states are as follows:

"1" is the state of waiting for dialling of the automatic exchange

"1P" is the state of waiting for dialling of the automatic exchange while a group protection is in progress "1C" is the state of waiting for dialling of the automatic exchange while a general call is in progress "2" is the state of waiting for the unhooking of a mobile subscriber terminal on an extra-group call "3.0" is the state of waiting for the sending by the automatic exchange 4 of the invitation to transmit the originator's number "3.1" is the state of waiting for the sending by the automatic exchange of a report on the number of the originating terminal "3.2" is the state of waiting for the sending by the automatic exchange 4 of the report of a service request "4" is the state of waiting for the unhooking of the called extra-group subscriber.

Each microprocessor 15 of the radio connecting unit 5 can be accessed according to 19 requests which are:

| | | |
|---|---|---|
| APSTR | ← | Individual extra-group call |
| APRDC | ← | Individual intra-group call |
| APCNF | ← | General intra-group call |
| APPDG | ← | Request for putting under protection |
| DECRO | ← | Unhooking of the terminal |
| FINPDG | ← | End of protection request |
| FINCO | ← | On-hooking of the terminal |
| CIPHER | ← | Request for change of encoding mode of the radio link |
| F-ALT | ← | Release of alternating mode |
| OUT | ← | Release of group by the operator of station 1 |
| → | IMPUL | Message received from the switching unit in the form of a pulse of 100 ms. According to the state of advance of the operation in progress this pulse is interpreted as PRISE, INVTR, REFUS or REPON |
| → | NUMER | Number of called radio subscriber |
| → | ACCEP | Acceptance of the service request |
| → | ABNIN | Originating or called subscriber not registered |
| → | REBOU | Loop command. The called subscriber belongs to the originators group |
| → | LIBER | Release of the call in progress by the switching exchange. |
| | ABSAV | Absence of voice activity on the radio segment over a determined time interval |
| | TEMPO | Expiry of time allocation. |

The requests with an arrow → are those received from the automatic exchange 4 while those with an arrow ← are those received from a mobile subscriber terminal 7ⱼ or from the operator of the station 1. The last 2 requests are internal.

The microprocessors 15 of the connecting unit 5 generates responses to the above requests. These responses are as follows:

| | |
|---|---|
| APSTR → | Individual extra-group call |
| APINT → | Individual intra-group call initiated as an extra-group call |
| APCNF → | General extra-group call |

| -continued | |
|---|---|
| APPDG → | Indication of placing the group under protection |
| APRCP → | Indication of placing in a protected circumstance network |
| DECRO → | Unhooking of the called subscriber |
| AC-SER → | Acceptance of the service request from the terminal |
| FINPDG → | Indication of end of group protection or of protected circumstance network |
| FINCO → | End of call following an onhooking of the terminal |
| FINSERV → | Acceptance of service request carried out by the terminal |
| REFUS1 → | Refusal of call initiated by the terminal because call group (sic) |
| REFUS2 → | Refusal of call initiated by the terminal for service request impossible to satisfy |
| REFUS3 → | Refusal of call initiated by the terminal because originator not registered |
| REFUS4 → | Refusal of call initiated by the terminal because called subscriber not registered |
| ← IMPUL | Message transmitted in the form of a pulse of 100 ms. Depending on the state of advance of the operation in progress, the exchange interprets this pulse as PRISE, INVTR or REPON |
| ← ACCEP | Acceptance of the number requested by the exchange to the group |
| ← NUMDR | Number of originating terminal of the service request |
| ← NUMDE | Service request passed by the TREC 860 |
| ← LIBER | Release of the call in progress |
| CRYPTO → | Setting the associated cryptophony equipment after a request for change of mode of operation by a terminal |

The requests with an arrow ← are those transmitted to the automatic exchange 4 while those with an arrow → are those transmitted to the terminal The programming of the microprocessors 15 in order to obtain the changes of states described above as a function of the requests made at the connecting unit 5 is illustrated by the tables in FIGS. 8A to 8Y. These programs are written into the memories 16 of each microprocessor 15.

We claim:

1. Device for the setting up and routing of telephone calls between subscribers of a radio telephone network and/or of a wired telephone network ($8_1$ ... $8_n$, 9) in which the subscribers of the radio telephone network have radio transceiver sets ($2_1$ ... $2_n$) operating in alternating mode and the subscribers of the two networds have dialing means ($8_1$ ... $8_n$, 31) in order to call their correspondents, of the type comprising an automatic telephone exchange (4) coupled with the wired telephone network by wired telephone lines, the automatic telephone exchange (4) being coupled to the radio telephone network by a plurality of radio transceivers ($3_1$ ... $3_4$) via a radio connecting unit (5) said radio connecting unit comprising a plurality of programmed processing units, each respectively coupled to a transceiver by interface circuits, and a signal modem, controlled by said interface circuits, for transmitting speech signals between the transceiver and the interface circuits, each of said interface circuits comprising voice activity detectors in order to enable transmission of calls in an alternating mode between the subscribers of the radio telephone network and between the subscribers of both networks, each processing unit ($12_i$) being programmed with hierarchic restrictions to enable an organization of the radio subscriber network into groups of radio subscribers communicating on a same frequency and/or on a same transmission channel, calls being able to take place between subscribers in a same group or between subscribers belonging to different groups, or between subscribers belonging to one group and the subscribers of the wired telephone network.

2. Device according to claim 1, wherein each processing unit is programmed for enabling the telephone subscribers to make automatic selective calls of radio subscribers.

3. Device according to claim 2, wherein each processing unit is programmed for enabling telephone subscribers to enter automatically and discreetly into the communications of radio network subscribers.

4. Device according to claim 3, wherein each processing unit is programmed for enabling the subscribers of the radio network to make an automatic selective call of any other subscriber of the radio network and/or of the wired telephone network.

5. Device according to claim 4, wherein each processing unit is programmed for enabling the radio subscribers to make automatic collective calls of other radio subscribers.

6. Device according to claim 5, wherein each processing unit is programmed for protecting the subscribers of the radio network from calls from subscribers of the wired telephone network.

7. Device according to claim 6, wherein each processing unit is programmed for enabling the subscribers belonging to two groups to be in continuous communication while being protected from the wired telephone network of the other groups in order to create protected circumstance networks.

8. Device according to claim 7, wherein each processing unit is programmed for enabling priority subscribers to exercise a right of preemption on a call set up between subscribers of the radio network.

9. Device according to claim 8, wherein each processing unit is programmed for cutting off calls between the subscribers of which at least one is a radio subscriber, within a determined period following an absence of voice activity detected by the means of voice activity detection.

10. A device according to claim 1, wherein each of the processing units is programmed according to a pattern having stable states and unstable states, readable in a status register to enable an organization of the radio subscriber network into groups of radio subscribers communicating on a same frequency and/or on a same transmission channel, calls being able to take place between subscribers in a same group or between subscribers belonging to different groups or between subscribers belonging to groups and subscribers belonging to the wired telephone network and wherein stable states comprise:

a first state or rest state indicating that no call is in progress;

a second state or S state indicating that an extra group call is in progress;

a third state of CINTRA state to declare to the automatic telephone exchange that general intra-group call is in progress;

a fourth state or CICT state to declare that a general intra-group call in progress in unknown by the automatic telephone exchange;

a fifth state or CICTT state for signalling that a general intra-group call in progress is unknown by the automatic telephone exchange;

a sixth or CINSERT for signalling that a general intra-group call is taking place with an extra-group subscriber;

a seventh state or CEXTRA state for signalling that a general extra-group call is in progress at the initiative of a subscriber external to the group;

an eighth state or I state for signalling that an individual intra-group call is in progress;

a ninth state or IICT state for signalling that an individual intra-group call in progress is unknown for the automatic exchange;

a tenth state or PINTRA state for signalling that a group which is in communication is protected from any insertion;

an eleventh state or PEXTRA state for signalling that a system of protected circumstances is created;

a twelfth state or PICTT state for signalling that a group in communication is protected and is unknown in the automatic exchange temporarily until the arrival of an insertion; and a thirteenth state or PINSERT state for signalling the fact that an extra-group subscriber is inserted into the communication of a group;

and unstable states comprise:

a fourteenth state for waiting for dialing of the automatic exchange;

a fifteenth state for waiting for dialing of the automatic exchange while a group protection is in progress;

a sixteenth state for waiting for dialing of the automatic exchange while a general call is in progress;

a seventeenth state for waiting for the unhooking of a mobile subscriber terminal on an extra-group call;

an eighteenth state for waiting for the sending by the automatic exchange "4" of an invitation to transmit the originator's number;

a nineteenth state for waiting for the sending by the automatic exchange of a report on the number of the originating terminal;

a twentieth state for waiting for the sending by the automatic exchange "4" of the report of a service request; and a twenty-first state for waiting for unhooking of the called extra-group subscriber.

* * * * *